United States Patent Office 3,517,007
Patented June 23, 1970

3,517,007
5 - ACETAMIDO - 4 - PYRIMIDINECARBOXAM-
IDES, 5 - ACETAMIDO - 4 - PYRIMIDINECAR-
BOXYLIC ACID HYDRAZIDES AND RELATED
COMPOUNDS
Dong H. Kim, Wayne, and Arthur A. Santilli, Havertown,
Pa., assignors to American Home Products Corporation, New York, N.Y., a corporation of Delaware
No Drawing. Filed Apr. 5, 1968, Ser. No. 719,237
Int. Cl. C07d 51/42
U.S. Cl. 260—256.4                    19 Claims

ABSTRACT OF THE DISCLOSURE

This invention is concerned with 5-acetamido-4-pyrimidenecarboxamides, 5 - amino - 4 - pyrimidinecarboxamides, 5 - acetamido - 4 - pyrimidinecarboxylic acid hydrazides and 5 - amino - 4 - pyrimidinecarboxylic acid hydrazides which are pharmacologically active as anticonvulsant agents.

---

The present invention relates to new and novel pyrimidenecarboxamides and pyrimidinecarboxylic acid hydrazides. More particularly, it concerns 5 - acetamido - 4 - pyrimidinecarboxamides, 5 - amino - 4 - pyrimidinecarboxamides, 5 - acetamido - 4 - pyrimidinecarboxylic acid hydrazides and 5 - amino - 4 - pyrimidinecarboxylic acid hydrazides which have demonstrated anticonvulsant activity when tested in standard and accepted pharamacological procedures.

The new and novel compounds within the scope of the present invention are exemplified by the following formula:

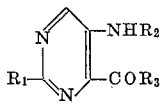

wherein $R_1$ is selected from the group consisting of lower alkyl, phenyl, halophenyl, lower alkylphenyl and lower alkoxyphenyl; $R_2$ is selected from the group consisting of hydrogen and acetyl; and $R_3$ is selected from the group consisting of hydrazino, lower alkoxy(lower)alkylamino, phen(lower)alkylamino, halophen(lower)alkylamino, pyrrolidinyl(lower)alkylamino, di(lower)alkylamino(lower)alkylamino, lower alkylpiperazinyl, anilino, haloanilino, and piperidino(lower)alkylamino. As employed herein the terms "lower alkyl" and "lower alkoxy" are meant to encompass both branched and straight chain moieties having from one to about eight carbon atoms. Typical examples thereof are: 5 - acetamido - 4 - (4-methyl - 1-piperazinylcarbonyl) - 2 - phenylpyrimidine; 5-acetamido-N-(3 - diethylaminopropyl) - 2 - phenyl - 4 - pyrimidinecarboxamide; 5 - acetamido - 4′ - fluoro - 2 - phenyl - 4-pyrimidinecarboxanilide; 5 - acetamido - 2 - (m-chlorophenyl) - N - (2 - methoxyethyl) - 4 - pyrimidinecarboxamide; 5 - amino - 2 - phenyl - N - [2-(1-pyrrolidinyl)ethyl] - 4 - pyrimidinecarboxamide; 5 - amino-N-(2-dimethylaminoethyl) - 2 - phenyl - 4 - pyrimidinecarboxamide; 5 - amino - 2 - (m-chlorophenyl)-N-(2-dimethylaminoethyl) - 4 - pyrimidinecarboxamide; 5 - acetamido-2-(m-chlorophenyl) - 4 - pyrimidinecarboxylic acid, hydrazide; and 5 - acetamido - 2 - phenyl - 4 - pyrimidinecarboxylic acid hydrazide.

The new and novel 5 - amino - 4 - pyrimidinecarboxamides and 5 - acetamido - 4 - pyrimidinecarboxamides of the present invention are prepared by the process which is depicted by the following reaction scheme:

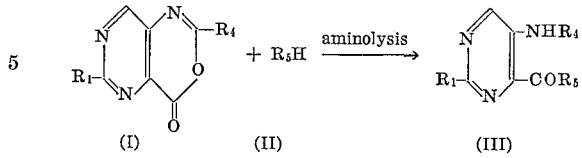

wherein $R_1$ is defined an above; $R_4$ is selected from the group consisting of methyl and trifluoromethyl; and $R_5$ is selected from the group consisting of lower alkoxy-(lower)alkylamino, phen(lower)alkylamino, halophen-(lower)alkylamino, pyrrolidinyl(lower)alkylamino, di-(lower)alkylamino(lower)alkylamino, lower alkylpiperazinyl, anilino, haloanilino and piperidino(lower)alkylamino. The aminolysis reaction is effected by contacting an appropriate 2,6 - disubstituted - 4H - pyrimido[5,4-d] [1,3]oxazin - 4 - one (I) with an amine (II) at a temperature range from about steam bath temperatures to about reflux temperatures for a period of about one-half hour to about three hours.

When the aminolysis reaction is complete the product (III) is separated by standard recovery procedures e.g. the excess amine is removed under vacuum and the residue recrystallized from a suitable solvent e.g. an alkanol, cyclohexane, dimethylformamide, benzene and the like. In the above-described process when the starting material is 2-methyl - 6 - substituted - 4H - pyrimido[5,4-d][1,3]-oxazin-4-one, the product is the corresponding 5-acetamido-4-pyrimidinecarboxamide. Alternatively, when the starting material is a 2-trifluoro-ethyl - 6 - substituted-4H-pyrimido[5,4-d][1,3]oxazin - 4 - one, the product is a 5-amido-4-pyrimidinecarboxamide.

The new and novel 5-acetamido-4-pyrimidinecarboxylic acid hydrazides and 5-amino-4-pyrimidinecarboxylic acid hydrazides of the present invention are prepared by the process which is exemplified by the following reaction scheme:

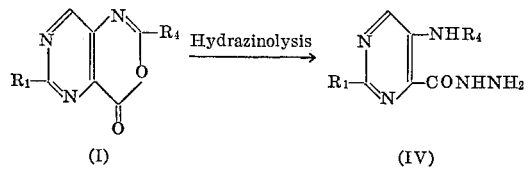

wherein $R_1$ and $R_4$ are defined as above. The hydrazinolysis reaction is conducted by contacting an appropriate 2,6-disubstituted-4H-pyrimido[5,4-d][1,3]oxazin-4-one (I) with hydrazine in an alkanol at about reflux temperatures for a period of about one to about four hours. Preferably this reaction is conducted in ethanol at the reflux temperature of the reaction mixture for about two hours.

When the hydrazinolysis reaction is complete, the product is recovered by conventional methods e.g. the reaction mixture is cooled, the precipitate collected and recrystallized from an appropriate solvent e.g. an alkanol. In this reaction when the starting compound is 2-methyl-6-substituted - 4H - pyrimido[5,4-d][1,3]oxazin - 4 - one, the product is a 5-acetamido-4-pyrimidinecarboxylic acid hydrazide. Alternatively, when the starting compound is a 2-trifluoromethyl-6-substituted-4H-pyrimido[5,4-d][1,3] oxazin-4-one, the product is 5-amino-4-pyrimidinecarboxylic acid hydrazide.

The starting compounds employed in the above-described process, both the 2-methyl-6-substituted-4H-pyrimido[5,4-d][1,3]oxazin-4-ones and the 2-trifluoromethyl-6-substituted-4H-pyrimido[5,4-d][1,3]oxazin - 4 - ones are prepared by the procedure disclosed in copending United States patent application, Ser. No. 719,238, entitled "2,6-Disubstituted-4H-Pyrimido[5,4-d][1,3]Oxazin-4-Ones," by Dong H. Kim and Arthur A. Santilli, and filed in the United States Patent Office on the same day as the subject application. The other materials employed in the above described processes are commercially available or as easily prepared by procedures well known in the chemical art.

The new and novel 5-acetamido-4-pyrimidinecarboxamides, 5-amino-4-pyrimidinecarboxamides, 5-acetamido-4-pyrimidinecarboxylic acid hydrazides and 5-amino-4-pyrimidinecarboxylic acid hydrazides of the present invention possess valuable pharmacological activity. In particular, these compounds in standard pharmacological procedures demonstrate anticonvulsant activity and are useful as anticonvulsant agents.

The anticonvulsant activity of the compounds of this invention was demonstrated in vivo in mice by the procedure described by Swinyard, E. A., Brown W. C., Goodman L. S., in J. Pharmacol. 106: 319, 1952. This activity was also confirmed by the anti-metrazol procedure described by G. Chen in Psychosomatic Medicine (J. H. Nodine and J. H. Moyer eds.) Lea and Febiger, Philadelphia, 1962, chap. 32.

When the compounds of this invention are employed as anticonvulsant agents they may be administered to warm-blooded animals e.g. mice, rats, guinea pigs, rabbits, cats, dogs, monkeys and the like alone or in combination with pharmacologically acceptable carriers, the proportion of which is determined by the solubility and chemical nature of the compound, chosen route of administration and standard biological practice. For example, they may be administered orally as a solid containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present anticonvulsant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 30 mg. to about 400 mg. per kilo per day, although as aforementioned variations will occur. However, a dosage level that is in the range of from about 100 mg. to about 200 mg. per kilo per day is most desirably employed in order to achieve effective results.

The following examples are given by way of illustration and are not to be construed as limitations of this invention, many variations of which are possible without departing from the scope and spirit thereof.

EXAMPLE I

Two and a half grams of 2-methyl-6-phenyl-4H-pyrimido[5,4-d][1,3]oxazin-4-one are added to 30 ml. of N,N-dimethylethylenediamine, and the resulting solution is refluxed for thirty minutes. Chilling of the reaction mixture causes precipitation of crystals which are collected on a filter and washed with water. The product weighs 3.0 g. and melts at 143–147° C. Recrystallization from absolute ethanol affords an analytical sample of 5-acetamido-N-(2-dimethylaminoethyl) - 2 - phenyl-4-pyrimidinecarboxamide, 143–146° C.

Analysis.—Calcd. for $C_{17}H_{21}N_5O_2$ (percent): C, 62.36; H, 6.47; N, 21.39. Found (percent): C, 62.11; H, 6.30; N, 21.56.

In a similar manner, 2,6-dimethyl-4H-pyrimido[5,4-d][1,3]oxazin-4-one is reacted with diethylaminobutylamine to afford 5-acetamido - N - (4 - dimethylaminobutyl)-2-methyl-4-pyrimidinecarboxamide.

EXAMPLE II 5-acetamido - N - (2 - methoxyethyl)-2-phenyl-4-pyrimidinecarboxamide is prepared as in Example I from 2.5 g. of 2-methyl-6-phenyl-4H-pyrimido[5,4-d][1,3]oxazin-4-one and 30 ml. of 2-methoxyethylamine to give 1.9 of product, M.P. 161–163° C.

Analysis.—Calcd. for $C_{16}H_{15}N_4O_3$ (percent): C, 61.13; H, 5.77; N, 17.83. Found (percent): C, 61.35; H, 5.95; N, 17.73.

5-acetamido - 4 - (4 - methyl-1-piperazinylcarbonyl)-2-phenylpyrimidine is prepared as in Example I from 2.5 g. of 2-methyl - 6 - phenyl-4H-pyrimido[5,4-d][1,3]oxazin-4-one and 30 ml. of N-methylpiperazine, to give 1.9 g. of product, M.P. 168–175° C.

Analysis.—Calcd. for $C_{18}H_{21}N_5O_2$ (percent): C, 63.70; H, 6.24; N, 20.64. Found (percent): C, 63.80; H, 6.02; N, 20.63.

EXAMPLE III

Two and a half grams of 2-methyl-6-phenyl-4H-pyrimido[5,4-d][1,3]oxazin-4-one is added to 30 ml. of 3-diethylaminopropylamine, and the resulting solution is refluxed for thirty minutes. Addition of a large excess of water to the reaction mixture causes separation of crystals which are collected on a filter. The product weighs 2.9 g. and melts at 80–83° C. Recrystallization from petroleum ether gives an analytical sample of 5-acetamido-N-(3-diethylaminopropyl) - 2 - phenyl-4-pyrimidinecarboxamide, M.P. 80.5–82.5° C.

Analysis.—Calcd. for $C_{20}H_{27}N_5O_2$ (percent): C, 65.01; H, 7.37; N, 18.96. Found (percent): C, 65.10; H, 7.30; N, 18.86.

EXAMPLE IV

Three grams of 2-methyl-6-phenyl-4H-pyrimido[5,4-d][1,3]oxazin-4-one are added to 15 ml. of p-fluoroaniline, and the resulting mixture is refluxed for forty minutes. Chilling and scratching of the reaction mixture with addition of anhydrous ether causes precipitation of a solid which is collected by filtration. Recrystallization from benzene affords 1.0 g. of 5-acetamido-4'-fluoro-2-phenyl-4-pyrimidinecarboxanilide, M.P. 223.5–226° C.

Analysis.—Calcd. for $C_{19}H_{15}FN_4O_2$ (percent): C, 65.14; H, 4.32; N, 15.99. Found (percent): C, 65.47; H, 4.48; N, 15.98.

EXAMPLE V 5-acetamido - 2 - (m - chlorophenyl)-N-(2-methoxyethyl)-4-pyrimidinecarboxamide is prepared as in Example IV from 2.5 g. of 6-(m-chlorophenyl)-2-methyl-4H-pyrimido[5,4-d][1,3]oxazin-4-one and 30 ml. of 2-methoxyethylamine to give 1.3 g. of product, M.P. 143.5–146° C.

Analysis.—Calcd. for $C_{16}H_{17}ClN_4O_3$ (percent): C, 55.11; H, 4.91; N, 16.06; Cl, 10.17. Found (percent): C, 55.28; H, 5.18; N, 16.01; Cl, 10.15.

1-[5-acetamido - 2 - (m - chlorophenyl)-4-pyrimidinylcarbonyl]-4-methylpiperazine is prepared as in Example IV from 2.5 g. of 6-(m-chlorophenyl)-2-methyl-4H-pyrimido[5,4-d][1,3]oxazin-4-one and 30 ml. of N-methylpiperazine to give 0.7 g. of product. An analytical sample (M.P. 147–149.5° C.) is obtained by recrystallization from heptane.

Analysis.—Calcd. for $C_{18}H_{20}ClN_5O_2$ (percent): C, 57.83; H, 5.39; N, 18.73; Cl, 9.48. Found (percent): C, 57.84; H, 5.35; N, 18.46; Cl, 9.5.

5-acetamido - 2 - (m - chlorophenyl)-N-(3-diethylaminopropyl)-4-pyrimidinecarboxamide is prepared as in Example IV from 2.5 g. of 6-(m-chlorophenyl)-2-methyl-4H-pyrimido[5,4-d][1,3]oxazin-4-one and 30 ml. of 3-diethylaminopropylamine to give 0.9 g. of product, M.P. 96–98° C.

Analysis.—Calcd. for $C_{20}H_{26}ClN_5O_2$ (percent): C, 59.47; H, 6.49; N, 17.34; Cl, 8.78. Found (percent): C, 59.53; H, 6.33; N, 17.38; Cl, 8.92.

5-acetamido - 2 - (m - chlorophenyl)-N-(3-piperidinopropyl)-4-pyrimidinecarboxamide is prepared as in Example IV from 2.5 g. of 6-(m-chlorophenyl)-2-methyl-4H-pyrimido[5,4-d][1,3]oxazin-4-one and 30 ml. of 3-N-piperidino-1-propylamine to give 2.7 g. of product, M.P. 124–128° C. Recrystallization from ethanol increases the M.P. to 127.5–130° C.

Analysis.—Calcd. for $C_{21}H_{26}ClN_5O_2$ (percent): C, 60.64; H, 6.30; N, 16.84; Cl, 8.52. Found (percent): C, 60.04; H, 6.32; N, 16.87; Cl, 8.76.

EXAMPLE VI

Repeating the procedure of Examples I–V to react a 2-methyl-6-substituted - 4H - pyrimido[5,4-d][1,3]oxazin-4-one with an appropriate amine the following compounds are obtained.

5-acetamido-2-ethyl-N-(2-dipropylaminoethyl)-4-pyrimidinecarboxamide;
5-acetamido-N-(3-ethoxypropyl)-2-propyl-4-pyrimidinecarboxamide;
5-acetamido-2-isobutyl-N-(4-methoxybutyl)-4-pyrimidinecarboxamide;
5-acetamido-2-(m-chlorophenyl)-4-(4-ethyl-1-piperazinylcarbonyl)pyrimidine;
5-acetamido-4-(4-butyl-1-piperazinylcarbonyl)-2-(p-tolyl)pyrimidine;
5-acetamido-2-(p-chlorophenyl)-4'-iodo-4-pyrimidinecarboxanilide;
5-acetamido-4'-bromo-2-(p-bromophenyl)-4-pyrimidinecarboxanilide;
5-acetamido-3'-chloro-2-(p-isopropylphenyl)-4-pyrimidinecarboxanilide;
1-[5-acetamido-2-(p-fluorophenyl)-4-pyrimidinylcarbonyl]-4-ethylpiperazine;
5-acetamido-2-(m-ethylphenyl)-N-(2-piperidinoethyl)-4-pyrimidinecarboxamide;
5-acetamido-2-(o-ethoxyphenyl)-N-(4-piperidinobutyl)-4-pyrimidinecarboxamide;
5-acetamido-N-benzyl-2-phenyl-4-pyrimidinecarboxamide;
5-acetamido-N-(p-chlorobenzyl)-2-(p-methoxyphenyl)-4-pyrimidinecarboxamide;
5-acetamido-N-(p-bromophenethyl)-2-(m-ethylphenyl)-4-pyrimidinecarboxamide;
5-acetamido-N-(p-fluorobenzyl)-2-phenyl-4-pyrimidinecarboxamide;
5-acetamido-2-phenyl-N-[3-(1-pyrrolidinyl)propyl]-4-pyrimidinecarboxamide; and
5-acetamido-2-methyl-N-[2-(1-pyrrolidinyl)ethyl]-4-pyrimidinecarboxamide.

EXAMPLE VII

Two and a half grams of 6-phenyl-2-trifluoromethyl-4H-pyrimido[5,4-d][1,3]oxazin-4-one is added in small portions with stirring to 15 ml. of 2-methoxyethylamine, and the resulting mixture is heated on a steambath for a half hour. The excess amine is removed under reduced pressure, and the residue recrystallized from ethanol to give 2.1 g. of 5-amino-N-(2-methoxyethyl)-2-phenyl-4-pyrimidinecarboxamide, M.P. 112–114° C.

Analysis.—Calcd. for $C_{14}H_{16}N_4O_2$ (percent): C, 61.75; H, 5.92; N, 20.58. Found (percent): C, 62.09; H, 5.99; N, 20.30.

EXAMPLE VIII

Two and a half grams of 6-phenyl-2-trifluoromethyl-4H-pyrimido[5,4-d][1,3]oxazin-4-one is added in small portions to 15 ml. of p-chlorobenzylamine with stirring, and the resulting mixture is refluxed for one hour. Pouring of the reaction mixture into 600 ml. of cold water causes separation of an oil which solidifies on chilling. The solid is separated by filtration and recrystallized from 95% ethanol to give 0.7 g. of 5-amino-N-(p-chlorobenzyl)-2-phenyl-4 - pyrimidinecarboxamide, M.P. 128–130° C.

Analysis.—Calcd. for $C_{18}H_{15}ClN_4O$ (percent): C, 63.81; H, 4.46; N, 16.54; Cl, 10.46. Found (percent): C, 63.97; H, 4.16; N, 16.26; Cl, 10.62.

EXAMPLE IX 5-amino-N-(3-methoxypropyl) - 2 - phenyl-4-pyrimidinecarboxamide is prepared as in Example VIII from 2.5 g. of 6-phenyl-2-trifluoromethyl-4H-pyrimido[5,4-d]-[1,3]oxazin-4-one and 15 ml. of 3-methoxypropylamine, to give 2.2 g. of product, M.P. 88.5–91° C.

Analysis.—Calcd. for $C_{15}H_{18}N_4O_2$ (percent): C, 62.92; H, 6.34; N, 19.57. Found (percent): C, 62.84; H, 6.42; N, 19.64.

5-amino - 2 - phenyl-N-[2-(1-pyrrolidinyl)ethyl]-4-pyrimidinecarboxamide is prepared as in Example VIII from 2.5 g. of 6-phenyl-2-trifluoromethyl-4H-pyrimido-[5,4-d][1,3]oxazin-4-one, and 15 ml. of 2-pyrrolidinoethylamine to give 2.3 g. of crude product, M.P. 137–143° C. Recrystallizations from ethanol and water increases M.P. to 144–146° C.

Analysis.—Calcd. for $C_{17}H_{21}N_5O$ (percent): C, 65.57; H, 8.80; N, 22.49. Found (percent): C, 65.46; H, 6.60; N, 22.21.

5-amino-N-(2-dimethylaminoethyl) - 2 - phenyl-4-pyrimidinecarboxamide is prepared as in Example VII from 3.0 g. of 6-phenyl-2-trifluoromethyl-4H-pyrimido[5,4-d]-[1,3]oxazin-4-one and 25 ml. of N,N-dimethylethylenediamine to give 2.6 g. of product, M.P. 141–143° C. after being recrystallized from cyclohexane.

Analysis.—Calcd. for $C_{15}H_{19}N_5O$ (percent): C, 63.14; H, 6.71; N, 24.55. Found (percent): C, 63.19; H, 6.78; N, 24.73.

5-amino - 2 - (m-chlorophenyl)-N-(2-dimethylaminoethyl)-4-pyrimidinecarboxamide is prepared as in Example VIII from 2.5 of 6-m-chlorophenyl-2-trifluoromethyl-4H-pyrimido[5,4-d][1,3]oxazin-4-one and 15 ml. of N,N-dimethylethylenediamine to give 1.8 g. of product, M.P. 134–137° C. Recrystallization from ethanol and water increases the M.P. to 137–139° C.

Analysis.—Calcd. for $C_{15}H_{18}ClN_5O$ (percent): C, 56.33; H, 5.67; N, 21.90; Cl, 11.09. Found (percent): C, 56.29; H, 5.28; N, 21.89.

EXAMPLE X

Repeating the procedure of Examples VII–IX to react to a 2 - trifluoromethyl-6-substituted-4H-pyrimido[5,4-d][1,3]oxazin-4-one with an appropriate amine the following compounds are obtained:

5-amino-N-(2-ethoxyethyl)-2-methyl-4-pyrimidinecarboxamide;
5-amino-N-(2-methoxypropyl)-2-(p-propoxyphenyl)-4-pyrimidinecarboxamide;
5-amino-N-(p-bromophenyl)-2-(m-chlorophenyl)-4-pyrimidinecarboxamide;
5-amino-N-(p-chlorophenpropyl)-2-ethyl-4-pyrimidinecarboxamide;
5-amino-N-(p-fluorobenzyl)-2-(p-tolyl)-4-pyrimidinecarboxamide;
5-amino-N-(m-iodophenethyl)-2-phenyl-4-pyrimidinecarboxamide;
5-amino-2-(p-chlorophenyl)-N-[4-(1-pyrrolidinyl)butyl]-4-pyrimidinecarboxamide;
5-amino-2-(p-bromophenyl)-N-(4-diethylaminobutyl)-4-pyrimidinecarboxamide;
5-amino-N-benzyl-2-(p-fluorophenyl)-4-pyrimidinecarboxamide;
5-amino-2-(p-butylphenyl)-4-(4-methyl-1-piperazinylcarbonyl)pyrimidine;
5-amino-4-(-ethyl-1-piperazinylcarbonyl)-2-(p-tolyl)pyrimidine;
5-amino-2-(o-ethoxyphenyl-4'-fluoro-4-pyrimidinecarboxanilide;
5-amino-3'-chloro-2-(p-methoxyphenyl)-4-pyrimidinecarboxanilide;

5-amino-4'-bromo-2-phenyl-4-pyrimidinecarboxanilide;
5-amino-2-(p-chlorophenyl)-N-(2-piperidinoethyl)-
4-pyrimidinecarboxamide;
5-amino-N-(3-piperidinopropyl)-2-(p-tolyl)-4-
pyrimidinecarboxamide;
1-[5-amino-2-(m-ethylphenyl)-4-pyrimidinylcarbonyl]-
4-methylpiperazine; and
1-[5-amino-2-methyl-4-pyrimidinylcarbonyl]-4-
ethylpiperazine.

EXAMPLE XI

A mixture of 1 g. of 6-(m-chlorophenyl)-2-methyl-4H-pyrimido[5,4-d][1,3]oxazin - 4-one in 65 ml. of ethanol containing 0.2 g. of hydrazine hydrate (99%) is heated under reflux for two and a half hours. The reaction mixture is cooled in ice and the precipitate which deposits is removed by filtration. Recrystallization from ethanol affords 0.6 g. of 2-acetamido-2-(m-chlorophenyl)-4-pyrimidinecarboxylic acid, hydrazide, M.P. 225–227° C.

*Analysis.*—Calcd. for $C_{13}H_{12}ClNO_2$ (percent): C, 51.08; H 3.96; Cl 11.60; N 22.89. Found (percent): C, 51.34; H, 3.85; Cl, 11.54; N, 23.31.

5 - acetamido-2-phenyl-4-pyrimidinecarboxylic acid, hydrazide is prepared as in Example XI from a mixture of 1 g. of 2 - methyl - 6-phenyl-4H-pyrimido[5,4-d][1,3] oxazin-4-one in 75 ml of ethanol containing 0.2 g. of hydrazine hydrate (99%). Recrystallization from ethanol gives a product with M.P. 187–189° C.

*Analysis.*—Calcd. for $C_{13}H_{13}N_5O_2$ (percent): C, 57.22; H, 4.80; N, 26.04. Found (percent): C, 57.56; H, 4.83; N, 25.82.

EXAMPLE XII

When the process of Example XI is repeated to react an appropriate 2-methyl-6-substituted-4H-pyrimido[5,4-d][1,3]oxazin-4-one with hydrazine hydrate, the following products are obtained:

5-acetamido-2-methyl-4-pyrimidinecarboxylic acid,
hydrazide;
5-acetamido-2-ethyl-4-pyrimidinecarboxylic acid,
hydrazide;
5-acetamido-2-isobutyl-4-pyrimidinecarboxylic acid,
hydrazide;
5-acetamido-2-(p-chlorophenyl)-4-pyrimidinecarboxylic
acid, hydrazide;
5-acetamido-2-(p-bromophenyl)-4-pyrimidinecarboxylic
acid, hydrazide;
5-acetamido-2-(p-fluorophenyl)-4-pyrimidinecarboxylic
acid, hydrazide;
5-acetamido-2-(p-tolyl)-4-pyrimidinecarboxylic acid,
hydrazide;
5-acetamido-2-(p-isopropoxyphenyl)-4-pyrimidine-
carboxylic acid, hydrazide;
5-acetamido-2-(m-ethylphenyl)-4-pyrimidinecarboxylic
acid, hydrazide;
5-acetamido-2-(p-butylphenyl)-4-pyrimidinecarboxylic
acid, hydrazide;
5-acetamido-2-(p-methoxyphenyl)-4-pyrimidinecarboxylic
acid, hydrazide; and
5-acetamido-2-(o-ethoxyphenyl)-4-pyrimidinecarboxylic
acid, hydrazide.

EXAMPLE XIII

A mixture of 2 g. of 6-phenyl-2-trifluoromethyl-4H-pyrimido[5,4-d][1,3]oxazin-4-one in 60 ml. of ethanol containing 0.4 g. of hydrazine hydrate (99%) is heated under reflux with stirring for two hours. After cooling in ice there is obtained 1.2 g. of product, M.P. 195–200° C. Recrystallization from methanol affords 0.8 g. of 5-amino-2-phenyl-4-pyrimidinecarboxylic acid, hydrazide, M.P. 197–199° C.

*Analysis.*—Calcd. for $C_{11}H_{11}N_5O$ (percent): C, 57.63; H, 4.84; N, 30.55. Found (percent): C, 57.46; H, 4.86; N, 30.53.

EXAMPLE XIV

When the process of Example XIII is repeated to react an appropriate 2-trifluoromethyl-6-substituted-4H-pyrimido[5,4-d][1,3]oxazin-4-one with hydrazine hydrate, the compounds represented by the following structural formula are prepared:

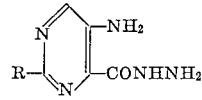

where R is defined as: m-chlorophenyl, phenyl, p-chlorophenyl, p-bromophenyl, p-fluorophenyl, methyl, ethyl, propyl, p-tolyl, p-propoxyphenyl, m-ethylphenyl, p-butylphenyl, p-methoxyphenyl and o-ethoxyphenyl.

What is claimed is:

1. A compound selected from the group consisting of those having the formula:

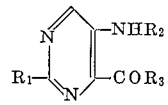

wherein $R_1$ is selected from the group consisting of lower alkyl, phenyl, halophenyl, lower alkylphenyl and lower alkoxyphenyl; $R_2$ is selected from the group consisting of hydrogen and acetyl; and $R_3$ is selected from the group consisting of hydrazino, lower alkoxy(lower)alkylamino, phen(lower)alkylamino, halophen(lower)alkylamino, pyrrolidinyl(lower)alkylamino, di(lower)alkylamino(lower)alkylamino, lower alkylpiperazinyl, anilino, haloanilino, and piperidino(lower)alkylamino.

2. A compound as described in claim 1 which is: 5-acetamido - N - (2 - dimethylaminoethyl)-2-phenyl-4-pyrimidinecarboxamide.

3. A comound as described in claim 1 which is: 5-acetamido - N - (2 - methoxyethyl)-2-phenyl-4-pyrimidinecarboxamide.

4. A compound as described in claim 1 which is: 5-acetamido - 4 - (4 - methyl-1-piperazinylcarbonyl)-2-phenylpyrimidine.

5. A compound as described in claim 1 which is: 5-acetamido - N - (3 - diethylaminopropyl)-2-phenyl-4-pyramidinecarboxamide.

6. A compound as described in claim 1 which is: 5-acetamido - 4' - fluoro - 2-phenyl-4-pyrimidinecarboxanilide.

7. A compound as described in claim 1 which is: 5-acetamido - 2 - (m - chlorophenyl)-N-(2-methoxyethyl)-4-pyrimidinecarboxamide.

8. A compound as described in claim 1 which is: 1-[5 - acetamido - 2 - (m-chlorophenyl)-4-pyrimidinylcarbonyl]-4-methylpiperazine.

9. A compound as described in claim 1 which is: 5-acetamido - 2 - (m - chlorophenyl)-N-(3-diethylaminopropyl)-4-pyrimidinecarboxamide.

10. A compound as described in claim 1 which is: 5-acetamido - 2 - (m - chlorophenyl)-N-(3-piperidinopropyl)-4-pyrimidinecarboxamide.

11. A compound as described in claim 1 which is: 5-amino-N-(2-methoxyethyl) - 2 - phenyl - 4 - pyrimidinecarboxamide.

12. A compound as described in claim 1 which is: 5-amino - N - (p-chlorobenzyl) - 2 - phenyl - 4 - pyrimidinecarboxamide.

13. A compound as described in claim 1 which is: 5-amino - N - (3 - methoxypropyl)-2-phenyl-4-pyrimidinecarboxamide.

14. A compound as described in claim 1 which is: 5-amino - 2 - phenyl - N-[2-(1-pyrrolidinyl)ethyl]-4-pyrimidinecarboxamide.

15. A compound as described in claim 1 which is: 5-amino - N - (2-dimethylaminoethyl)-2-phenyl-4-pyrimidinecarboxamide.

16. A compound as described in claim 1 which is: 5-amino - 2 - (m - chlorophenyl)-N-(2-dimethylaminoethyl)-4-pyrimidinecarboxamide.

17. A compound as described in claim 1 which is: 5-acetamido - 2 - (m - chlorophenyl)-4-pyrimidinecarboxylic acid, hydrazide.

18. A compound as described in claim 1 which is: 5-acetamido - 2 - phenyl - 4-pyrimidinecarboxylic acid, hydrazide.

19. A compound as described in claim 1 which is: 5-amino - 2 - phenyl - 4-pyrimidinecarboxylic acid, hydrazide.

References Cited

UNITED STATES PATENTS 3,470,185   9/1969   Huebner et al. ____ 260—256.4

ALEX MAZEL, Primary Examiner

R. J. GALLAGHER, Assistant Examiner

U.S. Cl. X.R.

260—244; 424—251

UNITED STATES PATENT OFFICE
CERTIFICATE OF CORRECTION

Patent No. 3,517,007  Dated June 23, 1970

Inventor(s) Dong H. Kim and Arthur A. Santilli

It is certified that error appears in the above-identified patent and that said Letters Patent are hereby corrected as shown below:

Column 4, between lines 51-52, there should be inserted the phrase:

--rimido[5,4-d][1,3]oxazin-4-one and 30 ml. of 2-methoxy-- and in the same column, line 55, should be deleted in entirety; and

Column 8, line 45, "pyramidinecarboxamide" should read

--pyrimidinecarboxamide--

SIGNED AND
SEALED
OCT 20 1970

(SEAL)
Attest:

Edward M. Fletcher, Jr.
Attesting Officer

WILLIAM E. SCHUYLER, JR.
Commissioner of Patents